(12) United States Patent
Yang et al.

(10) Patent No.: US 12,327,030 B2
(45) Date of Patent: *Jun. 10, 2025

(54) BRIDGING AUTHORIZATION STANDARD FOR CLOUD STORAGE

(71) Applicant: Google LLC, Mountain View, CA (US)

(72) Inventors: Xiao Yang, Woodbridge (CA); Craig Douglas Voisin, Mississauga (CA); Kalyan Pamarthy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,561

(22) Filed: Jun. 27, 2023

(65) Prior Publication Data

US 2023/0376220 A1 Nov. 23, 2023

Related U.S. Application Data

(63) Continuation of application No. 17/643,396, filed on Dec. 8, 2021, now Pat. No. 11,726,674.

(51) Int. Cl.
*G06F 3/06* (2006.01)
(52) U.S. Cl.
CPC .......... *G06F 3/0622* (2013.01); *G06F 3/0655* (2013.01); *G06F 3/067* (2013.01)
(58) Field of Classification Search
CPC ...... G06F 3/0622; G06F 3/0655; G06F 3/067; G06F 21/62; G06F 21/33
See application file for complete search history.

(56) References Cited

U.S. PATENT DOCUMENTS

| | | | |
|---|---|---|---|
| 9,781,602 B1 | 10/2017 | Girdhar et al. | |
| 11,061,652 B1 | 7/2021 | Biswas et al. | |
| 11,489,675 B1 * | 11/2022 | Makarskyy | H04L 63/061 |
| 11,726,674 B2 | 8/2023 | Yang et al. | |

(Continued)

OTHER PUBLICATIONS

International Preliminary Report on Patentability from International Application No. PCT/US2022/080551 dated Jun. 5, 2024, 5 pp.

(Continued)

*Primary Examiner* — Edward J Dudek, Jr.
*Assistant Examiner* — Ralph A Verderamo, III
(74) *Attorney, Agent, or Firm* — Shumaker & Sieffert, P.A.

(57) ABSTRACT

A computer-implemented method includes receiving, from a user account, an operation request to perform an operation on data stored at a distributed computing environment. The operation request includes an on-premises token associated with the user account. The method also includes extracting, from the on-premises token, an access scope associated with permissions of the user account for accessing the data stored at the distributed computing environment. The method also includes translating the extracted access scope into query parameters compatible with the data stored at the distributed computing environment. The method also includes determining, using the query parameters, whether the operation request can access the data stored at the distributed computing environment. When the operation request can access the data stored at the distributed computing environment, the method includes executing the operation request.

18 Claims, 7 Drawing Sheets

(56) References Cited

U.S. PATENT DOCUMENTS

| | | |
|---|---|---|
| 11,805,127 B1* | 10/2023 | Sundar ................ H04L 63/083 |
| 2017/0070498 A1 | 3/2017 | Fork et al. |
| 2017/0126685 A1* | 5/2017 | Taylor ................ G06F 21/6209 |
| 2018/0103009 A1 | 4/2018 | Eberlein |
| 2019/0141022 A1 | 5/2019 | Reeve et al. |
| 2020/0259817 A1 | 8/2020 | Natarajan et al. |
| 2020/0301938 A1 | 9/2020 | Gale et al. |
| 2021/0377278 A1 | 12/2021 | Mn et al. |
| 2022/0191185 A1 | 6/2022 | Carmon et al. |
| 2022/0292092 A1 | 9/2022 | Brown et al. |

OTHER PUBLICATIONS

International Search Report and Written Opinion of International Application No. PCT/US2022/080551 dated Feb. 27, 2023, 7 pp.
Notice of Allowance from U.S. Appl. No. 17/643,396 dated Mar. 23, 2023, 13 pp.
Response to Communication Pursuant to Rules 161(1) and 162 EPC dated Jul. 16, 2024, from counterpart European Application No. 22826575.7, filed Jan. 7, 2025, 16 pp.

* cited by examiner

BRIDGING AUTHORIZATION STANDARD FOR CLOUD STORAGE

CROSS REFERENCE TO RELATED APPLICATIONS

This U.S. Patent Applications is a continuation of, and claims priority under 35 U.S.C. § 120 from, U.S. patent application Ser. No. 17/643,396, filed on Dec. 8, 2021. The disclosure of this prior application is considered part of the disclosure of this application and is hereby incorporated by reference in its entirety.

TECHNICAL FIELD

This disclosure relates to a bridging authorization standard for cloud storage.

BACKGROUND

Cloud computing continues to increase in popularity as clients transition their data from on-site storage to cloud based storage to utilize the efficiencies and flexibility of cloud computing. On-site storage of data benefits from intimate integration between authorization servers and data storage hardware when authorizing user requests. Often times, however, when clients store data in the cloud based storage (i.e., off-premises) the authorization servers remain on-premises which effectively eliminates the intimate integration between the authorization servers and the data storage hardware. In this scenario, cloud computing environments may require users to take additional steps to verify whether the user is authorized to access data stored in the cloud. With thousands of different unique authorization servers each having a unique authorization process, managing the authorization standards can be cumbersome for cloud storage providers.

SUMMARY

One aspect of the disclosure provides a computer-implemented method that when executed on data processing hardware causes the data processing hardware to perform operations for parallelization of user requests. The operations include receiving, from a user account, an operation request to perform an operation on data stored at a distributed computing environment. The operation request includes an on-premises token associated with the user account. The operations also include extracting, from the on-premises token, an access scope associated with permissions of the user account for accessing the data stored at the distributed computing environment. The operations also include translating the extracted access scope into query parameters compatible with the data stored at the distributed computing environment. The operations also include determining, using the query parameters, whether the operation request can access the data stored at the distributed computing environment. When the operation request can access the data stored at the distributed computing environment using the query parameters, the operations include executing the operation request.

Implementations of the disclosure may include one or more of the following optional features. In some implementations, an on-premises computing system receives a login request from the user account and generates the on-premises token associated with the user account. Here, the operations may further include validating that the on-premises computing system is trusted. In some examples, the operations further include generating, based on the on-premises token, an off-premises token associated with permission for one or more downstream computing operations in the distributed computing environment.

The operations may further include sending, to an on-premises computing system, an access scope request requesting additional access scope of the user account and receiving, from the on-premises computing system, the additional access scope of the user account. In some implementations, the operations further include: extracting, from the on-premises token, a user context indicating a patient identifier; translating the extracted user context into additional query parameters compatible with the data stored at the distributed computing environment; determining, using the additional query parameters, whether the operation request can access the data stored at the distributed computing environment; and when the operation request can access the data stored at the distributed computing environment using the additional query parameters, executing the operation request.

Optionally, the query parameters may include a Hypertext Transfer Protocol (HTTP) header. In some examples, the operation request further includes an operation type associated with the operation and a data identifier associated with the data. In some implementations, the operations further include modifying the operation request based on the query parameters. The access cope may include at least one of a user account class, a data identifier, or an operation type.

Another aspect of the disclosure provides a system that includes data processing hardware and memory hardware storing instructions that when executed on the data processing hardware causes the data processing hardware to perform operations. The operations include receiving, from a user account, an operation request to perform an operation on data stored at a distributed computing environment. The operation request includes an on-premises token associated with the user account. The operations also include extracting, from the on-premises token, an access scope associated with permissions of the user account for accessing the data stored at the distributed computing environment. The operations also include translating the extracted access scope into query parameters compatible with the data stored at the distributed computing environment. The operations also include determining, using the query parameters, whether the operation request can access the data stored at the distributed computing environment. When the operation request can access the data stored at the distributed computing environment using the query parameters, the operations include executing the operation request.

Implementations of the disclosure may include one or more of the following optional features. In some implementations, an on-premises computing system receives a login request from the user account and generates the on-premises token associated with the user account. Here, the operations may further include validating that the on-premises computing system is trusted. In some examples, the operations further include generating, based on the on-premises token, an off-premises token associated with permission for one or more downstream computing operations in the distributed computing environment.

The operations may further include sending, to an on-premises computing system, an access scope request requesting additional access scope of the user account and receiving, from the on-premises computing system, the additional access scope of the user account. In some implementations, the operations further include: extracting, from the on-premises token, a user context indicating a patient identifier; translating the extracted user context into additional query parameters compatible with the data stored at the distributed computing environment; determining, using the additional query parameters, whether the operation request can access the data stored at the distributed computing environment; and when the operation request can access the data stored at the distributed computing environment using the additional query parameters, executing the operation request.

Optionally, the query parameters may include a Hypertext Transfer Protocol (HTTP) header. In some examples, the operation request further includes an operation type associated with the operation and a data identifier associated with the data. In some implementations, the operations further include modifying the operation request based on the query parameters. The access cope may include at least one of a user account class, a data identifier, or an operation type.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
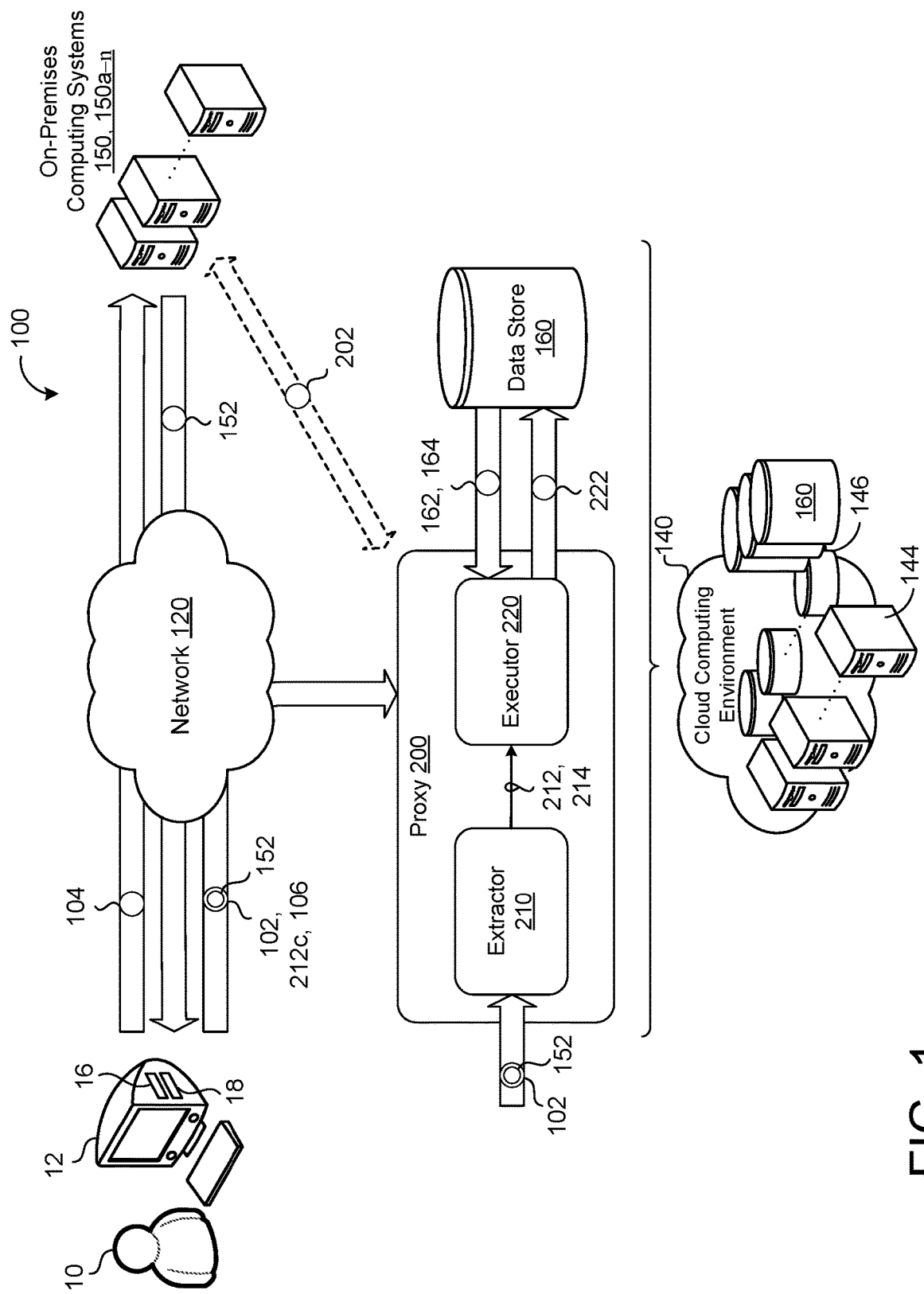
FIG. 1 is a schematic view of an example system for executing an access control proxy.

Fast Healthcare Interoperability Resources (FHIR) is a standard that defines a data format for data storage of electronic health records (EHRs) within a computing environment. Multiple clients (e.g., healthcare organizations) utilize the FHIR data format to store data for EHRs within the computing environments. The FHIR standard ensures that any user or client may retrieve and meaningfully interpret a stored EHR based on the standardized format. EHRs may include data for medical observations, medical tests, surgeries, medical prescriptions, allergy information, and/or any other relevant information. Moreover, the data may be associated with a particular patient or medical practitioner. As such, patients, medical practitioners, medical administrators, and/or any other users of the computing environment may share EHR data amongst one another.

Often times, EHRs include sensitive data that only certain users or clients with appropriate permissions are allowed to access. Accordingly, on-premises computing systems (i.e., authorization servers), require certain authorization standards in order for a user to access stored data. Substitutable Medical Applications Reusable Technology (SMART)-on-FHIR standardizes the process through which a user account of a software application (i.e., third party application) can access the EHR stored on a data store. That is, SMART-on-FHIR provides a security layer that sits on top of a FHIR data interface to restrict access to data stored at the data store to only authorized user accounts. Simply put, FHIR standardizes data formats for storing EHR data and SMART-on-FHIR standardizes the authentication process for accessing this data. Using SMART-on-FHIR, an authorization server may easily determine whether a user account has authorization to access data when the data store and the on-premises computing systems are located at the same location.

In some instances, data stored at a data store requires a unique authorization standard for accessing the respective data stored at the data store. That is, each on-premises computing system of the plurality of on-premises computing systems may require a unique authorization process for accessing data stored at the data store that is associated with the respective on-premises computing system. SMART-on-FHIR, however, does not consider the scenario where the data store is stored in a cloud computing environment and the on-premises computing system executes at a different, remote location from the data store. In this scenario, the cloud computing environment may not be able to determine whether a user account has sufficient permissions to access the data at the data store. Notably, as more and more data is stored in cloud computing environments rather than on-premises commuting systems, shortcoming of the SMART-on-FHIR authorization standard become apparent. Namely, the clients may have to map user access between the on-premises computing system and the cloud computing environment for hundreds of thousands of user accounts.

Implementations herein are directed towards systems and methods that include a proxy that bridges authorization standards between on-premises computing systems and cloud computing environments (e.g., off-premises computing systems). In particular, the proxy receives an operation request that includes an on-premises access token from a user account and extracts an access scope and a context scope from the on-premises access token. The proxy is configured to determine, using the access scope and the context scope, whether the user account has sufficient permissions to execute the operation request on the data stored at the data store. Simply put, using the access scope and the context scope, the proxy can determine whether the user account has permission to perform the operation on the data from one of a plurality of on-premises computing systems. Notably, the proxy allows the on-premises computing systems to extend the unique authorization processes to the cloud computing environment without requiring any mapping of the user account permissions between the on-premises computing system and the cloud computing environment.

Referring now to FIG. 1, in some implementations, an example system 100 includes a cloud computing environment 140. The cloud computing environment 140 may be a single computer, multiple computers, or a distributed system having scalable/elastic resources including computing resources 144 (e.g., data processing hardware) and/or storage resources 146 (e.g., memory hardware). A plurality of data stores 160 are overlain on the storage resources 146 to allow scalable use of the storage resources 146 by one or both of a user device 12 and the computing resources 144. The plurality of data stores 160 (i.e., distributed computing environment) store data 162 (e.g., for electronic health records (EHRs)) associated with multiple patients (i.e., users) 10. The data store 160 may store the data 162 a Fast Healthcare Interoperability Resources (FHIR) data format. As described herein, the disclosure considers storing medical data in the FHIR data format for clarity, however, it is understood that any data 162 may be stored at the data store 160 in any data format.

The system 100 includes one or more user devices 12 each associated with a respective user 10 and in communication with a cloud computing environment 140 and/or a plurality of on-premises computing systems 150, 150*a*—n via a network 120. Each user device 12 may correspond to a computing device such as a mobile phone, computer, wearable device, smart appliance, audio infotainment system, smart speaker, etc., and is equipped with data processing hardware 16 and memory hardware 18. In some examples, the user device 12 corresponds to any medical device (e.g., blood pressure monitor, heart rate monitor, electrocardiography (ECG) device, etc.) that collects data from a patient and/or displays data. The user device 12 may execute a software application (e.g., third party application) on the data processing hardware 16. The user 10 may be associated with a user account of the software application and include one or more permissions of the user 10 for accessing the data 162 stored at the cloud computing environment 140. For example, the user 10 may create a user account for a healthcare software application that allows the user 10 to retrieve the data 162 associated with the user 10. As such, user and user account may be used interchangeably herein.

In some examples, certain permissions are required to access the data 162 stored at the data store 160. As such, the system 100 also includes the plurality of on-premises computing systems 150 configured to control access to the data 162 stored at the data store 160. For example, a first authorization server 150, 150*a* may restrict access to some or all of the data 162 stored at the data store 160 thereby only allowing access to user accounts 10 authorized by the first authorization server 150*a*. Notably, the on-premises computing systems 150 may either be remote from the cloud computing environment (e.g., off-premises computing system) 140 or be on-premises with the cloud computing environment 140 (not shown). In some implementations, each on-premises computing system (which herein may be referred to interchangeably as an authorization server) 150 of the plurality of on-premises computing systems 150 includes a unique authorization standard for accessing data 162 at the data store 160 associated with the respective authorization server 150. That is, each authorization server 150 may store data 162 at the data store 160 and require a unique on-premises access token 152 to authorize that the user account 10 may access the data 162. The on-premises access token 152 may be unique to a computing system the authorization server 150 executes on. For example, the authorization server 150 may execute on an on-premises system, a cloud computing system (such as the cloud computing environment 140 or a different cloud computing environment), or a distributed computing system. Thus, the authorization server 150 and/or the user device 12 interacting with the proxy 200 may also be referred to as a client of the system 100.

The data 162 associated with the first authorization server 150*a* may have a first authorization process while data 162 associated with a second authorization server 150, 150*b* has a second authorization process different from the first authorization process. Here, the authorization process may refer to the process of validating the on-premises access token 152 and determining whether the on-premises access token 152 allows the user account 10 to access the data 162. Thus, the cloud computing environment 140 must be able to execute each authorization process (e.g., validate each unique on-premises access token 152) in order to determine whether a user account 10 has the correct permissions to access the data 162 stored at the data store 160 based on the on-premises token 152 provided by the user account 10.

In some implementations, the authorization server 150 executes on a different cloud computing environment in communication with the cloud computing environment 140. That is, a first cloud computing entity may operate different cloud computing environment executing the authorization server 150 and a second cloud computing entity may operate the cloud computing environment 140. Thus, the authorization server 150 operates on a first cloud computing environment while the data 162 is stored on a separate cloud computing environment 140. Here, the second cloud computing entity is unable to determine whether an on-premises token (e.g., an application-level token) 152 from the first cloud computing entity can access stored data 162. In particular, the first cloud computing entity may generate the application-level token 152 that the cloud computing environment 140 does not accept because the cloud computing environment 140 cannot directly validate and interpret the authorization context of the application-level token 152. Accordingly, the cloud computing environment 140 cannot effectively enforce security polices of which users 10 can access the stored data 162. In some examples, the authorization server 150 executes on the same cloud computing environment 140 where the data 162 is stored. In these examples, the authorization server 150 may use custom application-level tokens 152 that the cloud computing environment 140 is unable to interpret. The authorization server 150 may include any optional application servers as part of an application deployment environment.

The cloud computing environment 140 executes an access control proxy 200 that receives an operation request 102 from a user account 10 via the network 120. In particular, the user account 10 sends the operation request 102 requesting to perform an operation on data 162 stored at the data store 160. The operation request 102 may include an operation type 212*c* associated with the requested operation to perform on the data 162 and/or a data identifier 106 that identifies the requested data 162 at the data store 160. For example, the user account 10 sends an operation request 102 requesting to read medical test data 162 associated with the user 10 from the data store 160. The access control proxy 200 is configured to determine whether the user account 10 associated with the operation request 102 can access requested data 162 stored at the data store 160. That is, the access control proxy 200 (also referred to herein as simply "proxy 200") determines whether the user account 10 associated with the operation request 102 is authorized by one of the authorization servers 150 to access the requested data 162. More specifically, the proxy determines whether the user account 10 is authorized to access the data 162 based on an on-premises access token 152 generated by the authorization server 150 and presented by the user device 12 (e.g., by including the on-premises token 152 within the operation request 102).

Prior to the user 10 receiving the authorization token 152, in some examples, the proxy 200, in response to receiving the operation request 102, redirects the user account 10 to login and consent with a respective authorization server 150. In other examples, the user 10 submits login request 104 to the authorization server 150 directly via the network 120 prior to sending the operation request 102 to the proxy 200 to obtain the authorization token 152. The authorization server 150 includes permissions of multiple user accounts 10 for accessing data 162 at the data store 160. As such, in response to determining that the user 10 is authorized to at least a portion of the data 162 (e.g., by verifying/authenticating/validating user credentials), the authorization server 150 is configured to generate the on-premises access token 152 representing permissions for the user account 10 associated with the login request 104 to access a portion of the data 162 (i.e., the data associated with the user 10 and the authorization server 150). The login request 104 may include a username and password or any other credentials (e.g., biometric information) associated with the user account 10. The authorization server 150 may communicate the on-premises access token 152 to the user device 12 and/or to the proxy 200. The on-premises access token 152 (also referred to herein as simply on-premises token 152) includes permissions granting the user account 10 access to at least a portion of the data 162 stored at the data store 160 (i.e., other authorization servers 150 may grant access to other portions of the data 162).

Figure 2A:
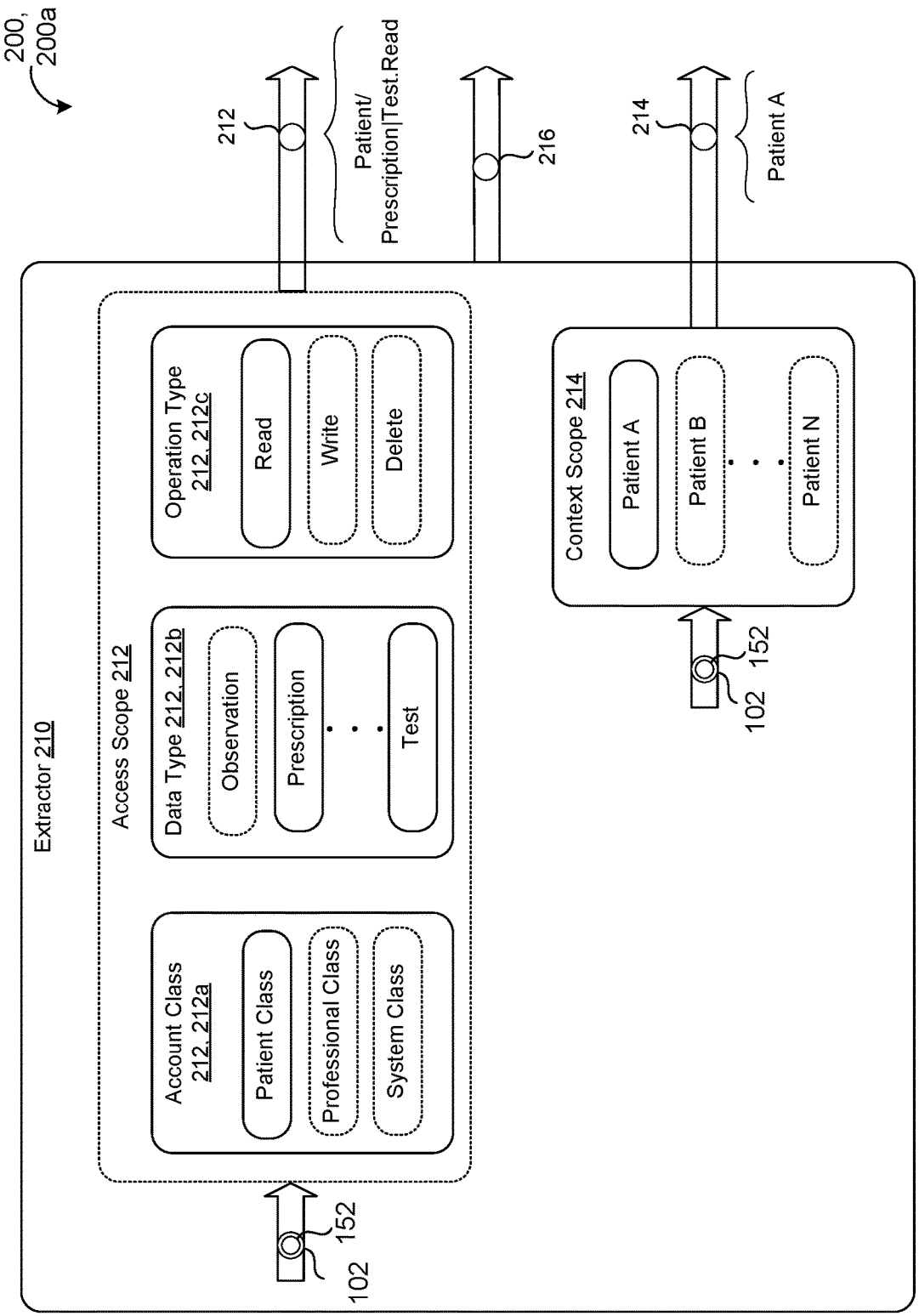
FIGS. 2A and 2B are schematic views of an extractor of the access control proxy.

In some implementations, the proxy 200 includes an extractor 210 and an executor 220. Referring now to FIGS. 1 and 2A, the extractor 210 receives the operation request 102 that includes the on-premises token 152 associated with the user account 10 and is configured to extract an access scope 212 from the on-premises token 152. The access scope 212 defines permissions of the user account 10 for accessing the data 162 stored at the data store 160. By extracting the access scope 212 from the on-premises token 152, the extractor 210 can determine which portions of the data 162 stored at the data store 160 the user account 10 has permission to access. The data store 160 may store a large quantity of data 162 (e.g., for a large number of users) and the authorization server 150 grants the user 10 access to only a portion of the data 162 that is associated with the user 10 and is governed by the authorization server 150.

The access scope 212 may include a user account class 212, 212a, a data type 212, 212b, and/or an operation type 212, 212c. The user account class 212a includes, for example, a patient class, a professional class, or a system class associated with the user account 10. That is, the user account class 212a indicates a type of user account 10 associated with the on-premises token 152. In some examples, the account class 212a does not distinguish between specific users of a user account class 212a. In these examples, the account class 212a merely indicates whether the user account 10 is associated with a patient class, professional class, or system class, but does not distinguish user accounts 10 within a user account class 212a. For example, the user account class 212a may indicate that the user account 10 (i.e., the user account 10 associated with the on-premises token 152) is associated with a patient user account, but does not distinguish patient A from patient B. Each user account class 212a may have different levels of permissions for accessing data 162 at the data store 160. For example, a user account 10 associated with a patient (i.e., user) user account class 212a may have limited access to data 162 stored at the data store 160 as compared to a user account 10 associated with a professional user account class 212b that has greater access to data 162 stored on at the data store 160. Moreover, a user account 10 associated with a system class may have access to all data 162 stored at the data store 160. The system class may be representative of a system administrator that needs access to all the data 162 at the data store 160.

The data type 212, 212b represents a specific type of data 162 that a user account 10 has permissions to access. The data type 212b may include, but is not limited to, observation type data, prescription type data, medical test type data, and/or any other relevant data type 212b. Here, the on-premises token 152 may only provide a user account 10 with access to a single data type 212b. Optionally, some on-premises tokens 152 have access to multiple and/or all data types 212b. The operation type 212c represents operations that a user account 10 can perform on the data 162 stored at the data store 160. The operations types 212c may include a read operation, a write operation, or a delete operation. For example, a user account 10 is only be able to perform read operations on data 162 while write operations and storage operations are unavailable (i.e., restricted) to the user account 10. In other examples, a user account 10 may be able to perform read and write operations on data 162 but not delete operations. In yet other examples, a user account 10 may be able to perform read, write, and delete operations on data 162 (or any combination of any number of operations).

Accordingly, the user account class 212a, data type 212b, and operation type 212c together define the data 162 and operations that the user account 10 has permission to execute. In some examples, the extractor 210 extracts the access scope 212 to include the following format (user account class 212a)/(data type 212b).(operation type 212c). That is, an access scope 212 may include patient/Obvervation.read which corresponds to a user account 10 that includes permissions of a patient user account 10 to read observation data. In an alternative example, an access scope 212 includes professional/Observation|Prescription.read-|write which corresponds to a user account 10 that include permissions of a professional user account class 212a that can perform read and write operation types 212c for observation and prescription data types 212b. In other examples, the extractor 210 extracts the access scope 212 in the FHIR data format.

In some examples, the extractor 210 is configured to extract a context scope 214 associated with the user account 10 from the on-premises token 152. In particular, the context scope 214 may include a patient identification (ID) associated with the user account 10. The context scope 214 restricts the operation request 102 from accessing any data 162 that is not associated with the patient ID. That is, when the on-premises token 152 includes context scope 214, the user account 10 is limited to only accessing data 162 associated with the patient ID. For example, an operation request 102 from a first user account 10 (i.e., "Patient A") that requests medical test data associated with the first user account 10 and has a context scope 214 identifying the first user is permissible. In this example, the same operation request 102 from a second user account 10 (i.e., "Patient B") that has a context scope identifying the second user account 10 is not permissible because the context scope 214 restricts the operation request 102 from accessing the medical test data associated with the first user account 10 (i.e., the second user account 10 does not correlate with the data 162 requested by operation request 102). Simply put, the second user account 10 may not be able to access data 162 associated with the first user account 10 based on the context scope 214. In some implementations, the on-premises token 152 does not include any context scope 214. For example, a user account 10 associated with a professional user account class 212a or a system user account class 212a may not have a patient ID included in the on-premises token 152 (and thus may not be correspondingly restricted in the data 162 that is accessible).

In some implementations, the proxy 200 sends a request (i.e., an access scope request) 202 to the authorization server 150 via the network 120 that requests additional access scope of the user account 10. That is, in these implementations, the authorization server 150 includes additional access scope 212 or context scope 214 information not included in the on-premises token 152. As such, the proxy 200 may request the additional information (e.g., additional access scope 212 or additional context scope 214) from the authorization server 150 that indicates further information of permissions of the user account 10. In some examples, in response to receiving the access scope request 202, the authorization server 150 returns metadata associated with the user account 10. For example, the metadata may include, but is not limited to, an expiration time of the on-premises token 152 for the user account, a number of operation requests 102 submitted by the user account 10, or any other information about the user account 10.

The extractor 210 may also generate an off-premises token (e.g., a GCP token) 216 using the on-premises token 152. The off-premises token 216 indicates permissions for one or more downstream computing operations in the cloud computing environment 140. For instance, the on-premises token 152 may not be compatible with the cloud computing environment 140, and thus, the proxy 200 must extract the access scope 212 and context scope 214 from the on-premises token 152 to determine permissions of the user account 10. The extractor 210 then generates the off-premises token 216 that is compatible with the cloud computing environment 140 using the extracted information. The off-premises token 216 may be associated with a service account that has full access to the cloud computing environment 140. Therefore, the off-premises token 216 includes all of the permissions of the user account 10 and additional permissions included in the service account. Moreover, the cloud computing environment 140 may use the off-premises token 216 to log operation requests 102 performed at the cloud computing environment 140. The operation request 102 logging (i.e., downstream computing operation) may be used to audit the operation requests 102.

Referring now to FIG. 2A, in the example shown, an example proxy 200, 200a includes the extractor 210 that receives the operation request 102 and the on-premises token 152. The extractor 210 extracts, from the on-premises token 152, an access scope 212 including at least one of an account class 212a, a data type 212b, or an operation type 212c. In the example shown, the extractor 210 extracts a patient class for the user account class 212a, a prescription and medical test data type 212b, and a read operation type 212c. Here, the extracted access scopes 212 are denoted by the solid lines and the non-extracted access scopes 212 are denoted by dashed lines. Thus, in this example, extracted access scope 212 from the on-premises token 152 represents a user account 10 in the patient user account class 212a that can perform read operation types 212c on prescription and medical test data types 212b (e.g., patient/prescription|medicaltest.read). In this example, the on-premises token 152 includes a context scope 214 because the user account 10 is a patient account (and the operation request 102 should be restricting in accessing other data 162). Thus, the extractor 210 extracts the context scope 214 from the on-premises token 152 indicating that the patient ID is for patient A. The extractor 210 sends the access scope 212 and context scope 214 to the executor 220. Optionally, the extractor 210 generates the off-premises token 216 that includes all of the permissions included in the access scope 212 and the context scope 214.

Figure 2B:
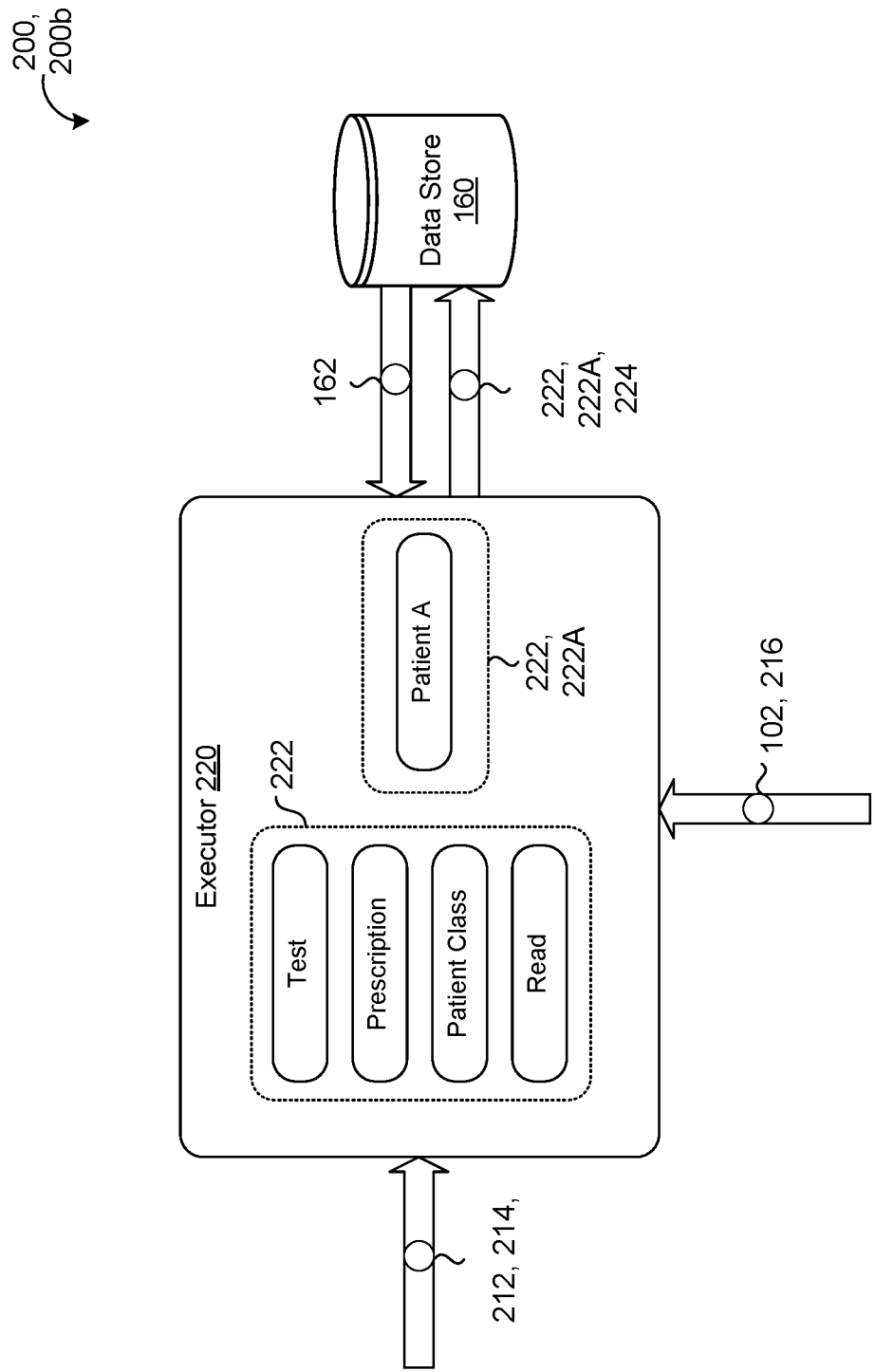

Referring now to FIGS. 1 and 2B, the executor 220 receives the access scope 212 and the context scope 214 from the extractor 210. The executor 220 is configured to determine whether the user account 10 associated with the operation request 102 has permission to access the data 162 referenced by the operation request 102. Specifically, the executor 220 determines whether user account 10 has sufficient permission to access the data 162 based on the access scope 212 and the context scope 214. In particular, the executor 220 determines whether the received access scope 212 and context scope 214 include the necessary authorization to perform the operations request 102 on the data 162 stored at the data store 160. Here, when the executor 220 determines that the operations request 102 can access data 162 stored at the data store 160, the executor 220 executes the operations request 102 at the data store 160. Alternatively, when the executor 220 determines that the operation request 102 cannot access the data 162 stored at the data store 160, the executor 220 rejects the operation request 102.

In some implementations, the executor 220 is configured to translate the extracted access scope 212 and/or context scope 214 into query parameters 222 compatible with the cloud computing environment 140. That is, the extracted access scope 212 and context scope 214 may include a FHIR data format that the cloud computing environment 140 is unable to interpret. As such, the executor 220 translates the access scope 212 into query parameters 222 compatible with the data store 160 to retrieve the data 162. In some examples, when the executor 220 receives context scope 214, the executor 220 translates the context scope 214 into additional query parameters 222, 222A. The executor 220 may translate the additional query parameters 222A in addition to, or in lieu of, the query parameters 222 from the access scope 212.

The executor 220 determines whether the operation request 102 can access the data 162 stored at the data store 160 using the query parameters 222 (i.e., whether the user 10 is authorized to access the data 162). In some implementations, the executor 220 makes the determination using only the query parameters 222 that the executor 220 translates from the on-premises token 152. In other implementations, the executor 220 makes the determination using the additional query parameters 222A in addition to, or in lieu of, the query parameters 222 of the access scope 212. When the executor 220 determines the user account 10 is authorized to execute the operation request 102, the executor 220 sends the query parameters 222, additional query parameters 222A, and/or a query 224 to the data store 160 to execute the operation request 102. In some instances, when the operation request 102 is a read operation request 102, the data store 160 returns the data 162 to the user account 10 via the network. In alternative instances, when the operation request 102 is a write or delete operation request 102, the data store 160 returns an indicator 164 indicating whether the operation request 102 executed successfully to the user account 10 via the network.

In some implementations, the executor 220 ensures that the data 162 returned to the user account 10 only includes data 162 for which one of the authorization servers 150 has authorized the user account 10 to access. Namely, the executor 220 may modify the operation request 102, filter data 162 returned to the user account 10, and/or issue one or more sub-operation requests to ensure the user account 10 only performs operations on data 162 that the user account 10 is authorized to access. That is, when the executor 220 determines the user account 10 does not have sufficient permissions to execute the operation request 102, the executor 220 modifies the operation request 102 such that the user account 10 has sufficient permissions to execute. For example, a user account 10 may send an operation request 102 requesting to read data 162 for all prescription data types for all patients even though the user account 10 only has permissions to read data 162 associated with a first patient. The executor 220 can further restrict the data 162 the data exposed by the data store 160 by adding additional restrictions on the operation request 102 and/or by filtering the data 162 returned to the user account 10 to only include data 162 the user account 10 has permission to access. Notably, by using this process, the executor 220 can limit the number of rejected operation requests 102 when a user account 10 sends an overbroad operation request 102. In some scenarios, an experienced user 12 may send the overbroad operation request 102 knowing that the executor 200 modifies the operation request 102 into an allowable operation request 102 for the user 12. In this scenario, the user 12 does not need to know what data 162 is accessible to the user 12 and instead relies on the proxy 200 to determine what data 162 is accessible by the user 12 and restrict the operation request 102 and/or filter the data 162 returned to the user account 10 accordingly.

Referring now to FIG. 2B, and continuing with the example from FIG. 2A, an example proxy 200, 200b includes the executor 220 that receives the context scope 214, the access scope 212, the off-premises token 216, and the operation request 102. In the example shown, the executor 220 translates the access scope 212 into query parameters 222 that are compatible with the executor 220 and the data store 160. For example, the query parameters 222 may include a Hypertext Transfer Protocol (HTTP) header. Accordingly, the executor 220 can interpret that the user account 10 is a patient user account class 212a that has access to medical test and prescription data types 212b for read operation types 212c. The executor 220 determines, using the query parameters 222, whether the user account 10 has permission to execute the operation request 102. Continuing with the example, the executor 220 translates the context scope 214 into additional query parameters 222A. In this example, the additional query parameters 222A indicate that the user account 10 is associated with a patient ID of "Patient A." The executor 220 determines whether the user account 10 has permission to execute the operation request 102 using the additional query parameters 222A.

Continuing with the example, the executor 220 determines that the user account 10 has sufficient permissions to execute the operation request 102. As such, the executor 220 sends the query parameters 222, the additional query parameters 222A, and the query 224 to the data store 160 to execute the corresponding operation request 102. The executor 220 may translate the operations request 102 into the query 224 such that the data store 160 can execute the corresponding operation request 102. That is, the executor 220 may translate the operations request 102 into a form executable by the data store 160 (i.e., the query 224). Here, the data store 160 returns data 162 associated with the operation request 102 because the operations request 102 is a read operation.

Figure 3:
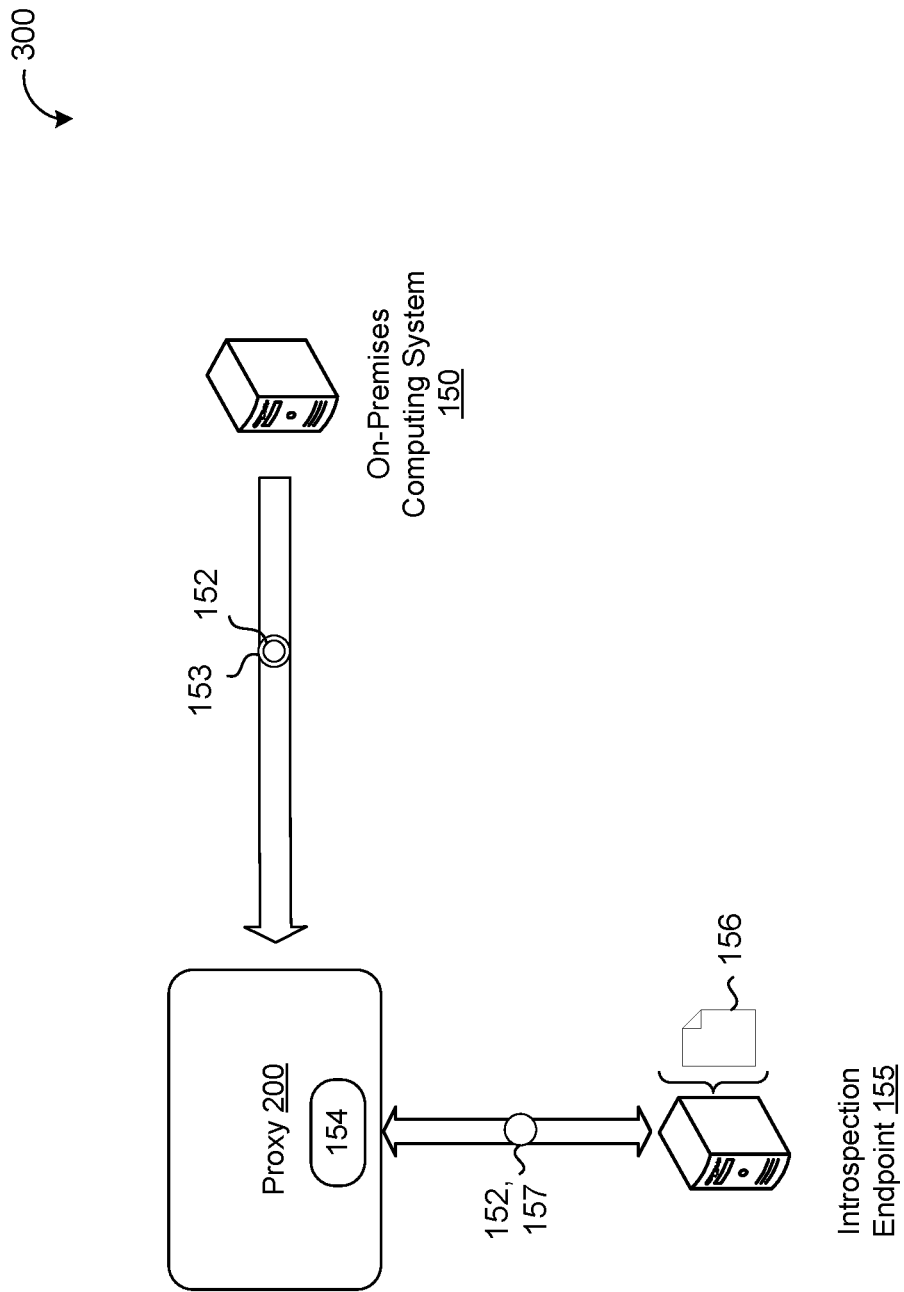
FIG. 3 is a schematic view of the access control proxy validating an on-premises access token.

Referring now to FIG. 3, in some implementations, a computing environment 300 validates the on-premises token 152 generated by the authorization server 150 using the proxy 200. That is, the proxy 200 validates that the on-premises token 152 has not been altered by another entity and that the authorization server 150 is a valid authorization server 150. In some examples, the on-premises token 152 represents the permissions of a user account 10 in a FHIR data format. In other examples, the on-premises token 152 includes a JavaScript Object Notation (JSON) data format such as a JSON web token (JWT). Here, the JWT on-premises token 152 includes embedded Substitutable Medical Applications Reusable Technology (SMART) access scopes 212 and embedded SMART context scopes 214. The JWT on-premises token 152 includes a signature encrypted by a private key 153 of the respective authorization server 150 that can be decrypted with a corresponding public key 154 and validated. That is, the authorization server 150 encrypts the signature of the token with the private key 153. Thus, with access to the public key 154 the proxy 200 can validate the signature encrypted by the private key 153 for each authorization server 150 by decrypting the signature using the corresponding public key 154 and validating the signature. The proxy 200 may validate that the on-premises token 152 was generated by a valid authorization server 150 by determining whether the signature is valid. After the proxy 200 validates the on-premises token 152, the proxy 200 may extract the embedded context scope 214 and/or access scope (i.e., SMART access scope) 212. Accordingly, without the corresponding public key 154, the proxy 200 is unable to validate the signature of the on-premises token 152 and extract the context scope (i.e., SMART context scope) 214.

In some examples, the proxy 200 is pre-configured to validate the on-premises access token 152 by receiving and storing a unique public key 154 for each authorization server 150. That is, each authorization server 150 may have a unique public key 154 that the proxy 200 must store to validate the JWT on-premises token 152. In other examples, the proxy 200 is pre-configured to validate the on-premises token 152 by receiving and storing a JSON web key set (JWKS) endpoint for each authorization server 150. Here, the proxy 200 communicates with the JWKS endpoint to receive a corresponding public key 154 for a private key 153. In some instances, the authorization servers 150 authorize (e.g., whitelists or allowlists) the proxy 200 to receive the public key 154 from the JWKS endpoint. In other instances, the JWKS endpoint is a public endpoint and the proxy 200 does not require authorization to receive the public key 154. The proxy 200 may periodically obtain the public key 154 from the JWKS endpoint and determine whether the public key 154 has been revoked or is still available for the proxy 200 to use. JWKS endpoint may periodically check whether an authorization server 150 has revoked access to a public key 154 for the proxy 200.

In some implementations, the on-premises token 152 includes an opaque string such that the proxy 200 is unable to either validate the signature of the on-premises token 152 or interpret the necessary authorization context of the on-premises token 152. Here, the proxy 200 is configured to determine an introspection endpoint 155 for a corresponding authorization server 150. Alternatively, the proxy 200 may be configured to determine a uniform resource locator (URL) for the introspection endpoint 155 using a discovery endpoint of the authorization server 150. After the proxy 200 determines the introspection endpoint 155, the proxy 200 communicates with the introspection endpoint 155 to receive the context scope 214 and/or the access scope 212 associated with the on-premises token 152. That is, the URL may provide context scope 214 and/or access scope 212 information for received on-premises tokens 152. The proxy 200 can use the access scope 212 and/or context scope 214 from the URL in addition to, or in lieu of, the access scope 212 and/or context scope 214 extracted from the on-premises token 152. The introspection endpoint 155 validates whether the on-premises token 152 is valid. In some examples, the proxy 200 may forward the on-premises token 152 to the introspection endpoint 155 which in turn provides a response 157 that includes a URL to the proxy 200. Thereafter, the proxy 200 communicates with the URL that provides context scope 214 and/or access scope 212 associated with the on-premises token 152 to the proxy. In some implementations, the introspection endpoint 155 only allows token validations from computing systems included in an access control list (ACL) 156. Thus, the proxy 200 may be pre-configured as one of the computing systems permitted (e.g., allowlisted) on the ACL 156 to receive URLs for on-premises tokens 152. Thus, in response to receiving the on-premises token 152, the introspection endpoint 155 may determine whether the proxy 200 is included in the ACL 156 before providing a response.

Figure 4:
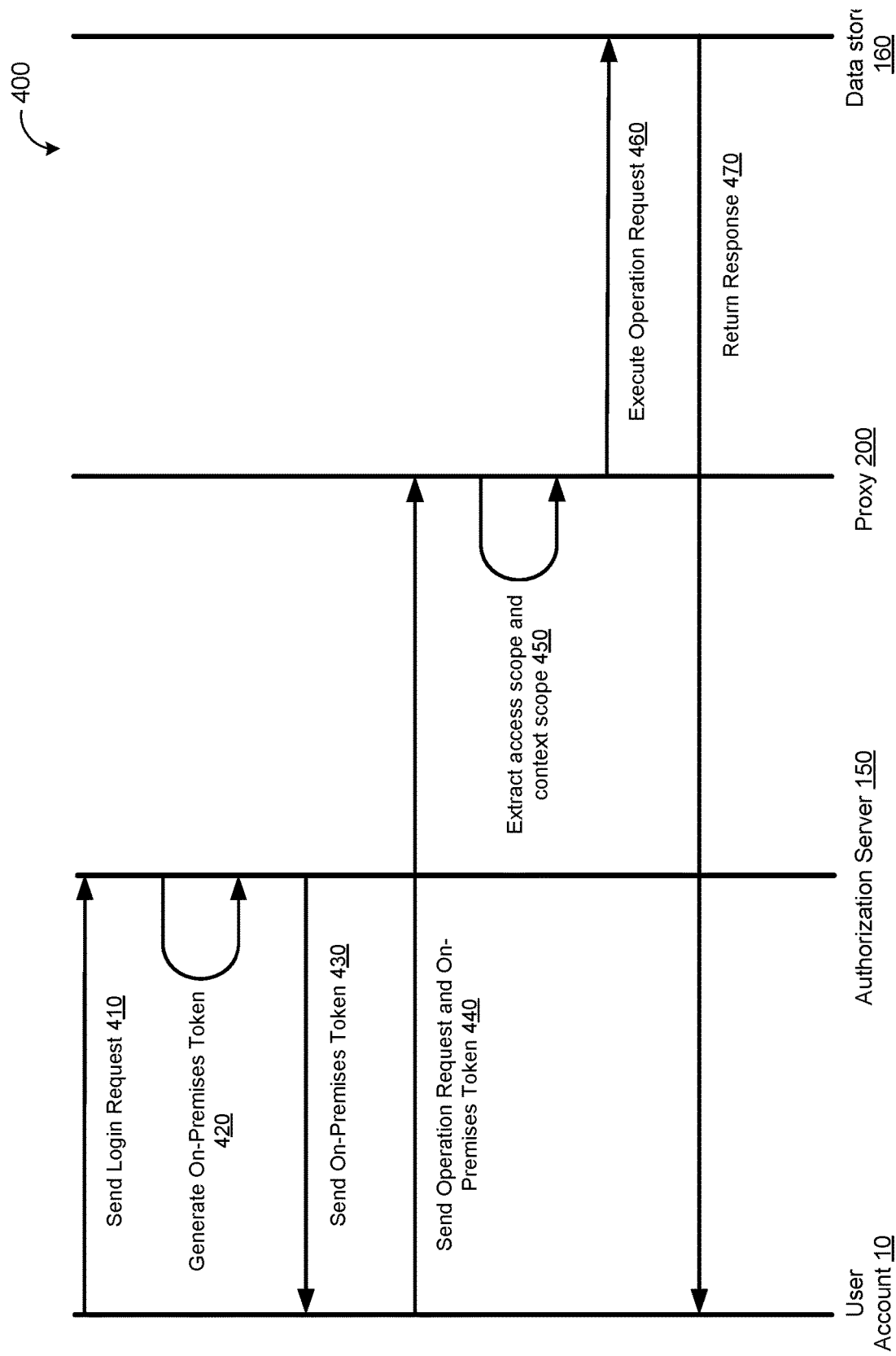
FIG. 4 is an exemplary sequence diagram for bridging authorization between a user account, access control proxy, and an authorization server.

FIG. 4 provides exemplary a sequence diagram 400 for bridging authorization between an authorization server 150 and cloud computing environment 140 (i.e., cloud computing environment 140 executing a data store 160). Here, the Y-axis of the sequence diagram 400 represents time increasing from top to bottom to provide an order to the operations. The operations begin at the top of the Y-axis (i.e., an earliest point in time) and proceed in order down the Y-axis. The sequence of operations in the example shown is exemplary only, and thus, it is understood that the operations may be performed in any sequence. The parallel vertical lines represent the user account 10, the authorization server 150, the proxy 200, and the data store 160 (i.e., distributed computing environment 140) respectively.

At operation 410, the user account 10 sends a login request 104 to the authorization server 150. In some examples, the proxy 200 redirects the user account 10 to send the login request 104 to the authorization server 150 in response to the proxy receiving an operation request 102 (e.g., an operation request without an on-premises token 152). At operation 420, the authorization server 150 determines permissions for the user account 10 associated with the login request 104 and generates an on-premises token (e.g., an application-level token) 152 representing the permissions of the user account. At operation 430, the authorization server 150 sends the on-premises token 152 to the user account 10. Additionally or alternatively, the authorization server 150 may send the on-premises token 152 to the proxy 200. At operation 440, the user account 10 sends the operation request 102 that includes the on-premises token 152 to the proxy 200. The operation request 102 may request to perform an operation on specified data 162 stored at the data store.

The proxy 200 is configured to determine whether the user account 10 is authorized to perform the operation request 102 on the specified data 162. Accordingly, at operation 450, the proxy 200 extracts an access scope 212 and/or context scope 214 (e.g., user context) from the received on-premises access token 152. Moreover, the proxy 200 may validate, using the on-premises token, that the on-premises token 152 is a valid on-premises token 152 and validate that the authorization server 150 is a valid authorization server 150. For example, the proxy 200 may validate a JWT on-premises token 152 signature using a public key 154 or forward the opaque string on-premises token 152 to an introspection endpoint 155. After the proxy 200 validates the on-premises token 152, the proxy 200 trusts the context scope 214 and access scope 212 extracted from the on-premises token 152.

Using the extracted access scope 212 and extracted context scope 214, the proxy 200 determines whether the user account 10 is authorized to perform the operation request 102 on the specified data 162 stored at the data store 160. At operation 460, when the proxy 200 determines the user account 10 is authorized to access the data 162, the proxy 200 allows the operation request 102 to execute on the data store 160 (e.g., the data store 160 executing on the cloud computing environment 140). At operation 470, in response to executing the operation request 102, the data store 160 returns a response to the user account 10. For example, when the operation request 102 requests a read operation, the data store 160 returns the specified data 162. In another example, when the operation request 102 requests a deletion operations or a write operation, the data store 160 returns an indicator that indicates whether the operation executed successfully.

In some implementations, the extractor 210 and the executor 220 are included in two separate layers or processes of the proxy 200. That is, the extractor 210 (executing independently from the executor 220) is configured to validate the on-premises token 152 and extract access scopes 212 and context scopes 214 from the on-premises token 152. Thereafter, the extractor 210 makes a remote procedure call (RPC) to provide the extracted access scopes 212 and context scopes 214 to the executor 220. The executor 220 may determine whether the extractor 210 is a valid extractor and, when the extractor 210 is valid, the executor 220 trusts the received access scopes 212 and the context scopes 214. Here, the executor 220 uses the access scopes 212 and the context scope 214 to determine whether the operation request 102 can access the data 162.

Figure 5:
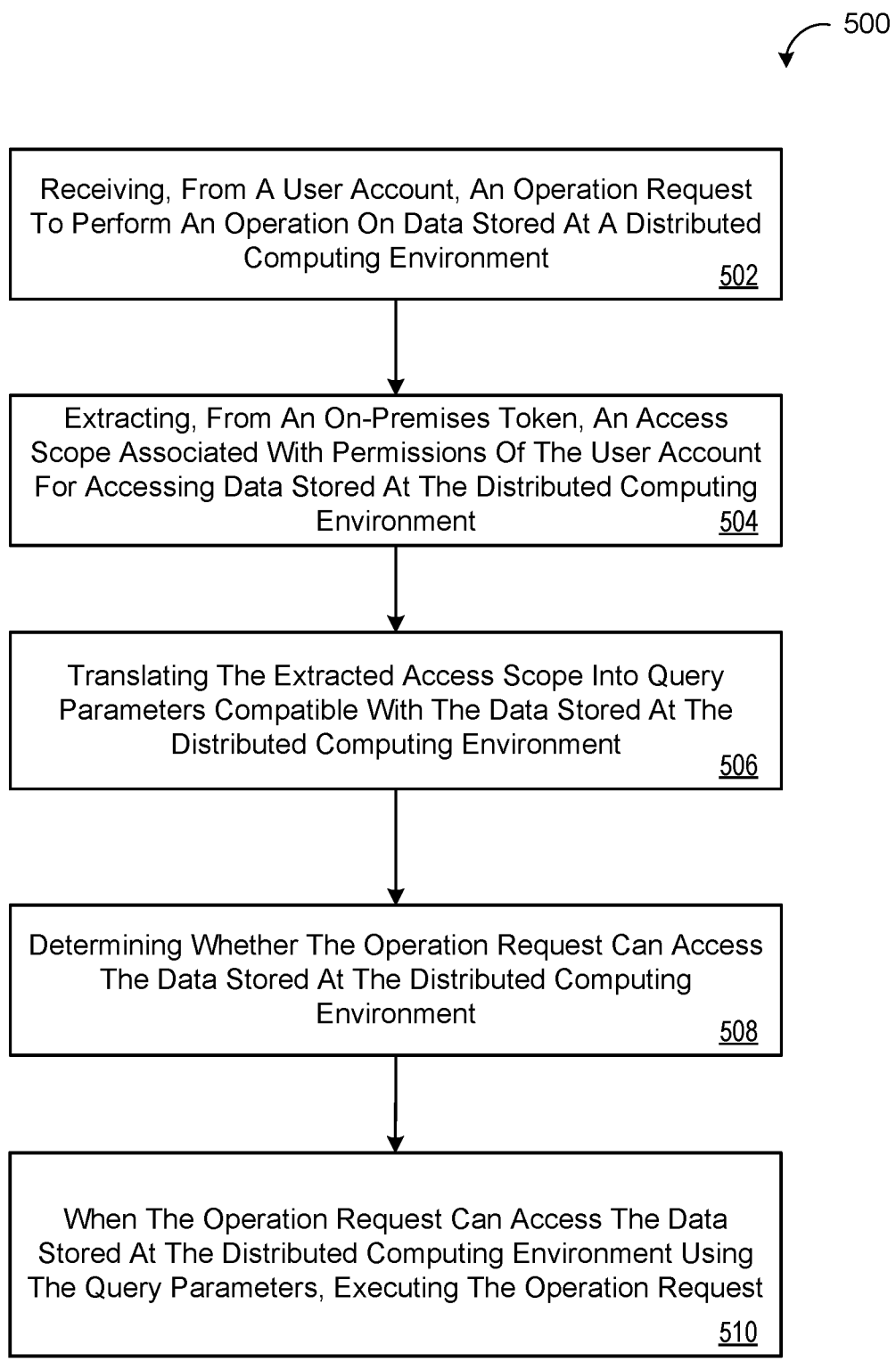
FIG. 5 is a flowchart of an example arrangement of operations for a method of bridging authorization between an on-premises computing system and an off-premises computing system.

FIG. 5 is a flowchart of an exemplary arrangement of operations for a computer-implemented method 500 of bridging authorization between an on-premises computing system (i.e., authorization server) 150 and an off-premises computing system (i.e., cloud computing environment) 140. At operation 502, the method 500 includes receiving, from a user account 10, an operation request 102 to perform an operation on data 162 stored at a distributed computing environment (i.e., data store) 160. The operation request 102 includes an on-premises token 152 associated with the user account 10. At operation 504, the method 500 includes extracting, from the on-premises token 152, an access scope 212 associated with permissions of the user account 10 for accessing the data 162 stored at the distributed computing environment 140. At operation 506, the method 500 includes translating the extracted access scope 212 into query parameters 222 compatible with the data 162 stored at the distributed computing environment 140. At operation 508, the method 500 includes determining, using the query parameters 222, whether the operation request 102 can access the data 162 stored at the distributed computing environment 140. At operation 510, when the operation request 102 can access the data 162 stored at the distributed computing environment 140 (i.e., the user account 10 has sufficient permissions), the method 500 includes executing the operation request 102. Conversely, when the operation request 102 cannot access the data 162 stored at the distributed computing environment 140, the method 500 includes rejecting the operation request 102.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 6:
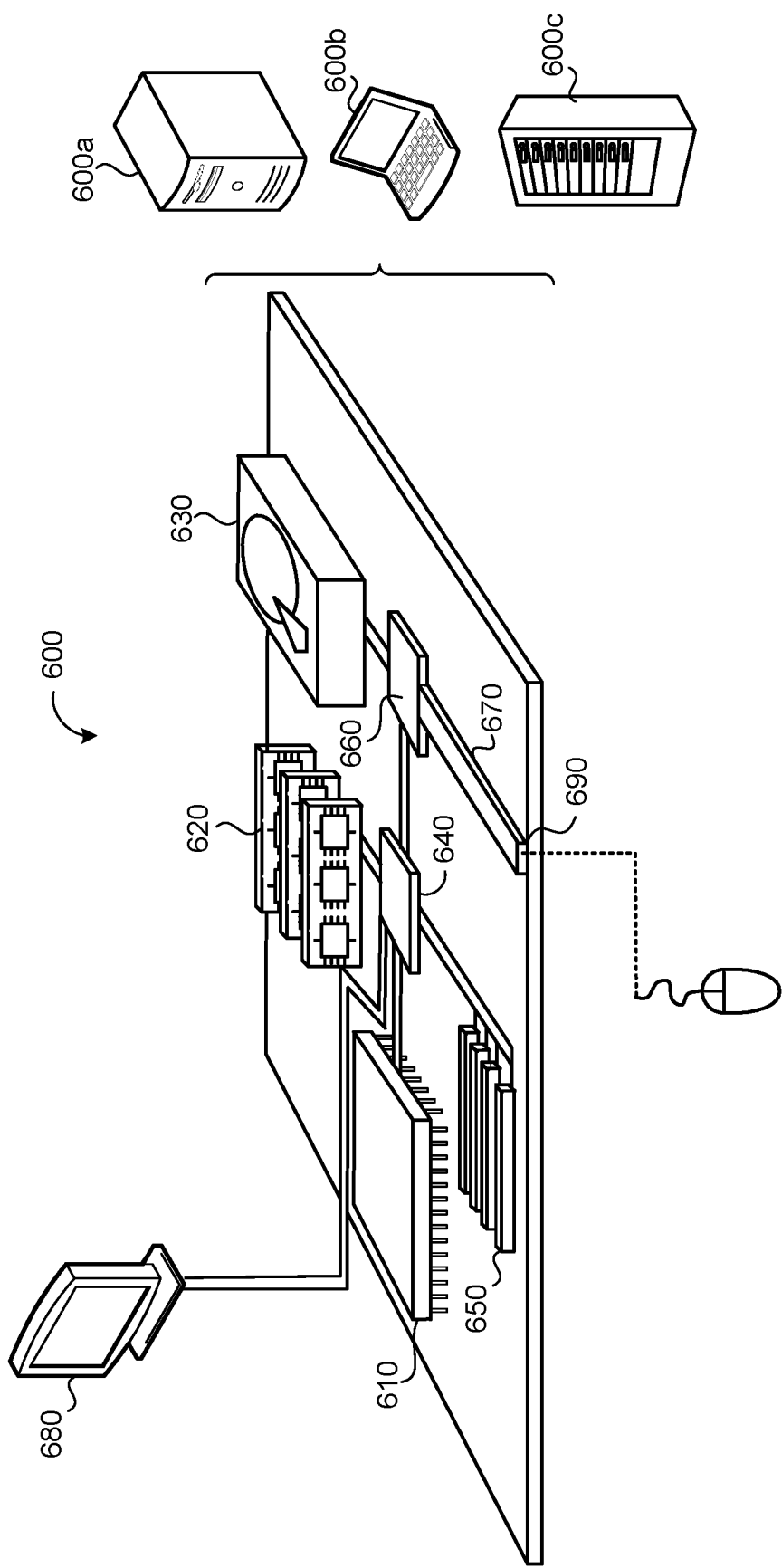
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving, from a user account, an operation request to perform an operation on data stored at a distributed computing environment, the operation request comprising an on-premises token associated with the user account;
   extracting an access scope and a user context from the on-premises token, the access scope associated with permissions of the user account for accessing data stored at the distributed computing environment, the user context indicating a patient identifier associated with the user account, the access scope comprising at least one of:
   a user account class;
   a data type; or
   an operation type;
   determining, using the access scope and the user context, that the operation request is authorized to access the data stored at the distributed computing environment; and
   based on determining that the operation request is authorized to access the data stored at the distributed computing environment, executing the operation request.

2. The computer-implemented method of claim 1, wherein an on-premises computing system:
   receives a login request from the user account; and
   generates the on-premises token associated with the user account.

3. The computer-implemented method of claim 2, wherein the operations further comprise validating that the on-premises computing system is trusted.

4. The computer-implemented method of claim 1, wherein the operations further comprise generating, based on the on-premises token, an off-premises token associated with permissions for one or more downstream computing operations in the distributed computing environment.

5. The computer-implemented method of claim 1, wherein the operations further comprise:
   sending, to an on-premises computing system, an access scope request requesting additional access scope of the user account; and
   receiving, from the on-premises computing system, the additional access scope of the user account.

6. The computer-implemented method of claim 1, wherein the operation request further comprises an operation type associated with the operation and a data identifier associated with the data.

7. The computer-implemented method of claim 1, wherein the operations further comprise modifying the operation request based on the access scope and the user context.

8. The computer-implemented method of claim 1, wherein the operations further comprise validating the on-premises token.

9. The computer-implemented method of claim 1, wherein the on-premises token comprises a JavaScript Object Notation (JSON) web token.

10. A system comprising:
    data processing hardware; and
    memory hardware in communication with the data processing hardware, the memory hardware storing instructions that when executed on the data processing hardware cause the data processing hardware to perform operations comprising:
    receiving, from a user account, an operation request to perform an operation on data stored at a distributed computing environment, the operation request comprising an on-premises token associated with the user account;
    extracting an access scope and a user context from the on-premises token, the access scope associated with permissions of the user account for accessing data stored at the distributed computing environment, the user context indicating a patient identifier associated with the user account, the access scope comprising at least one of:
    a user account class;
    a data type; or
    an operation type;
    determining, using the access scope and the user context, that the operation request is authorized to access the data stored at the distributed computing environment; and
    based on determining that the operation request is authorized to access the data stored at the distributed computing environment, executing the operation request.

11. The system of claim 10, wherein an on-premises computing system:
    receives a login request from the user account; and
    generates the on-premises token associated with the user account.

12. The system of claim 11, wherein the operations further comprise validating that the on-premises computing system is trusted.

13. The system of claim 10, wherein the operations further comprise generating, based on the on-premises token, an off-premises token associated with permissions for one or more downstream computing operations in the distributed computing environment.

14. The system of claim 10, wherein the operations further comprise:
- sending, to an on-premises computing system, an access scope request requesting additional access scope of the user account; and
- receiving, from the on-premises computing system, the additional access scope of the user account.

15. The system of claim 10, wherein the operation request further comprises an operation type associated with the operation and a data identifier associated with the data.

16. The system of claim 10, wherein the operations further comprise modifying the operation request based on the access scope and the user context.

17. The system of claim 10, wherein the operations further comprise validating the on-premises token.

18. The system of claim 10, wherein the on-premises token comprises a JavaScript Object Notation (JSON) web token.

* * * * *